United States Patent [19]

Kantner et al.

[11] Patent Number: 5,536,768
[45] Date of Patent: Jul. 16, 1996

[54] HYDROPHILIC PRESSURE SENSITIVE ADHESIVES

[75] Inventors: Steven S. Kantner, St. Paul; Nancy J. Rustad, Afton; James S. Stefely, Woodbury, all of Minn.

[73] Assignee: Minnesota Mining and Manufacturing Company, St. Paul, Minn.

[21] Appl. No.: 583,456

[22] Filed: Jan. 5, 1996

Related U.S. Application Data

[62] Division of Ser. No. 983,688, Dec. 1, 1992, Pat. No. 5,489,624.

[51] Int. Cl.$^6$ .............................. C08K 5/06; B32B 7/12
[52] U.S. Cl. .................. 524/376; 524/377; 524/379; 428/355; 523/111; 427/208.4
[58] Field of Search ................... 523/111, 427; 524/376, 377, 379; 428/355; 427/208.4

[56] References Cited

U.S. PATENT DOCUMENTS

| | | | |
|---|---|---|---|
| 3,509,234 | 4/1970 | Burlant et al. | 260/859 |
| 3,928,299 | 12/1975 | Rosenkranz et al. | 260/89.5 |
| 4,233,425 | 11/1980 | Tefertiller et al. | 525/455 |
| 4,273,135 | 6/1981 | Larimore et al. | 128/640 |
| 4,497,914 | 2/1985 | Allen, Jr. et al. | 523/105 |
| 4,517,326 | 5/1985 | Cordts et al. | 524/310 |
| 4,650,817 | 3/1987 | Allen Jr. et al. | 523/105 |
| 4,684,558 | 8/1987 | Keusch et al. | 428/40 |
| 4,706,680 | 11/1987 | Keusch et al. | 128/640 |
| 4,714,655 | 12/1987 | Bordoloi et al. | 427/208.4 |
| 4,777,276 | 10/1988 | Rasmussen et al. | 556/419 |
| 4,777,954 | 10/1988 | Keusch et al. | 128/640 |
| 4,837,290 | 6/1989 | Rasmussen et al. | 526/304 |
| 4,855,077 | 8/1989 | Shikinami et al. | 252/518 |
| 4,914,223 | 4/1990 | Rasmussen et al. | 560/49 |
| 4,925,908 | 5/1990 | Bernard et al. | 526/320 |
| 4,996,243 | 2/1991 | Rasmussen et al. | 522/99 |
| 5,059,424 | 10/1991 | Cartmell et al. | 424/443 |
| 5,106,629 | 4/1992 | Cartmell et al. | 424/445 |
| 5,112,618 | 5/1992 | Cartmell et al. | 424/443 |
| 5,115,801 | 5/1992 | Cartmell et al. | 602/48 |
| 5,154,706 | 10/1992 | Cartmell et al. | 604/307 |
| 5,160,328 | 11/1992 | Cartmell et al. | 604/307 |
| 5,382,451 | 1/1995 | Johnson et al. | 427/208.4 |

FOREIGN PATENT DOCUMENTS

| | | | |
|---|---|---|---|
| 0271292 | 6/1988 | European Pat. Off. | A61L 15/06 |
| 0528091A1 | 2/1993 | European Pat. Off. | A61F 13/02 |
| 0067581 | 4/1985 | Japan | 427/208.4 |
| WO83/01617 | 5/1983 | WIPO | C07C 101/00 |
| WO89/00771 | 1/1989 | WIPO | H01M 6/18 |
| WO90/03155 | 4/1990 | WIPO | A61F 13/02 |
| WO90/11719 | 10/1990 | WIPO | A61B 5/04 |
| WO93/00410 | 1/1993 | WIPO | C09J 133/00 |

OTHER PUBLICATIONS

DATABASE WPI, Derwent Publications Ltd., London, GB; AN 89-352208(48) & JP,A 1 263 106 (Kyowa Gas Co.), Oct. 19, 1989.

*Primary Examiner*—Paul R. Michl
*Assistant Examiner*—LaVonda R. DeWitt
*Attorney, Agent, or Firm*—Gary L. Griswold; Walter N. Kirn; John H. Hornickel

[57] ABSTRACT

A hydrophilic, pressure sensitive adhesive of a poly(ethylene oxide) derived network plasticized with an essentially non-volatile, polar plasticizer present in an amount sufficient to form a cohesive, pressure sensitive adhesive. The polymeric network is prepared from an oligomeric precursor comprising difunctional poly(ethylene glycol) moieties which have been end-capped with ethylenically unsaturation. The adhesive is useful as a biomedical adhesive for transmitting or receiving electrical signals as a component of a biomedical electrode. The adhesive is also useful as a drug delivery device to deliver pharmaceuticals or other active ingredients to or through mammalian skin. The adhesive is also useful as a component in a skin covering for protecting mammalian skin or mammalian skin openings with antimicrobial agents. A method of preparation of the adhesive is also disclosed.

3 Claims, 2 Drawing Sheets

HYDROPHILIC PRESSURE SENSITIVE ADHESIVES

This is a division of application No. 07/983,688 filed Dec. 1, 1992 now U.S. Pat. No. 5,489,624.

FIELD OF THE INVENTION

This invention relates to hydrophilic poly(ethylene oxide) (PEO) pressure sensitive adhesives and medical products using such adhesives.

BACKGROUND OF THE INVENTION

Previously, hydrophilic pressure sensitive adhesives based on PEO polymer networks have been prepared. Examples of hydrophilic pressure sensitive adhesives based on PEO polymer networks are disclosed in U.S. Pat. No. 4,684,558 (Keusch et al.); U.S. Pat. No. 4,706,680 (Keusch et al.); and U.S. Pat. No. 4,777,954 (Keusch et al.) which teach the preparation of an adhesive poly(ethylene oxide) hydrogel sheet by subjecting an aqueous PEO solution to high energy radiation.

Also, European Patent Publication 0 271 292 (Ansell) teaches the preparation of a skin friendly PSA by reacting a polyfunctional isocyanate with a polyoxyalkylene diol monoalkyl ether and a hydroxyl-containing ester of (meth-)acrylic acid and then crosslinking the polymer (optionally in the presence of 40 to 65% water) by means of irradiation.

Also, U.S. Pat. No. 4,855,077 (Shikinami et al.) and the Derwent Abstract of Japanese Patent Publication 62-139628 (Takiron), teach the preparation of an ion-conductive polymer adhesive agent by reacting an alkylene oxide containing polyol with a polyurethane polyisocyanate prepolymer in the presence of an ionic compound which can include water.

U.S. Pat. Nos. 4,497,914 and 4,650,817 (both Allen et al.) also teach the reaction of a polyoxyalkylene polyol with an organic polyisocyanate while incorporating a hydrophilic filler to give an elastomeric adhesive for skin contacting applications. The presence of water is specifically excluded, presumably to prevent undesirable side reaction with the isocyanate.

U.S. Pat. No. 4,273,135 (Larimore et al.) discloses poly-(oxyethylene) (also known as PEO) as one of the non-ionic synthetic hydrophilic polymers useful as a conductive material for a biomedical electrode and suggests plasticization with alcohols as a means of imparting conformability.

Methods of preparing difunctional (telechelic) poly(ethylene glycol)s with free-radically polymerizable end groups are known in the art. For example, U.S. Pat. No. 3,928,299 (Rosenkranz et al.) and U.S. Pat. No. 4,233,425 (Tefertiller et al.) both disclose products resulting from reaction of poly(alkyleneoxide)s with compounds such as isocyanatoethyl methacrylate. U.S. Pat. No. 3,509,234 (Burlant et al.) discloses a reaction of a hydroxylated polymer with first a diisocyanate and then a hydroxyalkyl (meth)acrylate. Also, U.S. Pat. Nos. 4,777,276; 4,837,290; 4,914,223; and 4,996,243 (all Rasmussen et al.) disclose reaction products obtained from vinyl dimethyl azlactone and poly(ethylene glycol) diamines.

SUMMARY OF THE INVENTION

The current invention provides a family of hydrophilic pressure sensitive adhesives based on plasticized poly(ethylene oxide) (PEO) derived networks.

"Poly(ethylene oxide) derived networks" or "PEO derived networks" means networks derived from poly(ethylene oxide) or copolymers of poly(ethylene oxide) connecting polymer chains formed from ethylenically unsaturated moieties.

PEO derived networks are prepared by free-radically polymerizing oligomeric precursors of difunctional (i.e., telechelic) poly(ethylene glycol) (PEG) which has been end-capped with ethylenically unsaturated functionality.

Hence, the oligomeric precursor used to prepare adhesives of the present invention has a low viscosity, is readily processable, and is free of solvents that must be removed after polymerization, i.e., solventless. Further, the crosslink density of the precursor is predetermined. Also, the adhesives can be prepared rapidly and reliably without requiring specialized equipment and without generating concerns about potentially toxic or irritating unreacted low molecular weight monomers.

The method of the invention permits great latitude in the choice of formulation used, allowing one to tailor performance attributes over a wide range. This latitude for PEO pressure sensitive adhesives was previously unavailable in the prior art.

The adhesives of the present invention and their method of preparation solve problems encountered by the prior art efforts.

None of the references disclosing PEO polymer systems identified above teach the use of essentially non-volatile polar plasticizers, such as low molecular weight poly(ethylene glycol)s, to plasticize PEO polymers formed from oligomeric precursors containing poly(ethylene glycol) moieties, in order to form hydrophilic PEO pressure sensitive adhesives.

Use of such essentially non-volatile polar plasticizers provides a wider latitude in imparting "feel" and adhesive characteristics to the resulting hydrophilic pressure sensitive adhesive. The essentially non-volatile polar plasticizers also serve as a humectant to help retain moisture under ambient conditions and prevent the resulting hydrophilic PEO pressure sensitive adhesive gel from embrittling due to water evaporation. Otherwise, a PEO polymer plasticized with essentially volatile plasticizers will have a very short useful life in ambient conditions.

Such essentially non-volatile polar plasticizers cannot be used with oligomeric precursors in the methods taught by Keusch et al. referenced above because the essentially non-volatile polar plasticizers will seriously reduce the crosslinking efficiency. Also, such essentially non-volatile polar plasticizers cannot be used in the Shikinami-Takiron or Allen et al. approaches because an isocyanate moiety will not be able to discriminate between such plasticizers and the polyol meant for reaction.

The present invention is also different from the teaching of Larimore et al. because Larimore et al. teach toward requiring coating and drying to prepare a conformable cohesive film. No curing step is described or contemplated. Larimore et al. do not therefore teach the in situ preparation of the hydrophilic pressure sensitive adhesives in a solventless fashion using oligomeric precursors in the presence of essentially non-volatile polar plasticizers.

The references teaching methods of preparing difunctional (telechelic) poly(ethylene glycol)s with free-radically polymerizable end groups do not disclose that useful materials result when these oligomers are polymerized in the presence of non-reactive diluents such as essentially, non-volatile polar plasticizers.

The hydrophilic pressure sensitive adhesives of the present invention comprise a crosslinked, swellable PEO derived network formed by free radical polymerization of at least one oligomeric precursor of Formula I:

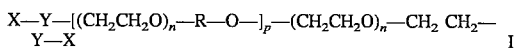

$$X-Y-[(CH_2CH_2O)_n-R-O-]_p-(CH_2CH_2O)_n-CH_2CH_2-Y-X \qquad I$$

wherein X are monovalent moieties having ethylenic unsaturation,

Y are organic divalent linking groups which serve to activate X towards free radical polymerization, R is an organic divalent linking group, n is an integer of about 10 to about 350, and p is an integer of about 0 to about 30, such that $45 < n(p+1) < 450$, in the presence of sufficient essentially non-volatile polar plasticizer as to render the PEO derived network pressure sensitive adhesive.

Preferably, the PEO derived network comprises from about 4 to about 60 weight percent of the pressure sensitive adhesive and the essentially non-volatile polar plasticizer comprises from about 96 to about 40 weight percent of the pressure sensitive adhesive in order to render the PEO derived network pressure sensitive adhesive.

The function of $n(p+1)$ being between 45 and 450 is satisfied when the telechelic polyethylene glycol moiety has a molecular weight ranging from about 2,000 to about 20,000.

In a preferred embodiment the essentially non-volatile polar plasticizer is a hydroxy-containing plasticizer selected from the group consisting of monohydric alcohols, polyhydric alcohols, aromatic alcohols, and mixtures of water and such alcohols where the amount of alcohol is sufficient to render the plasticizer essentially non-volatile.

Optionally, hydrophilic pressure sensitive adhesives of the present invention can also contain an electrolyte. In another aspect of the present invention, the ionically conductive, hydrophilic pressure sensitive adhesive can be used as a component in biomedical electrodes.

The process of preparing hydrophilic pressure sensitive adhesives of the present invention involves subjecting a mixture of the telechelic PEG oligomeric precursor and essentially non-volatile polar plasticizer to a source of free radicals to induce free radical polymerization of the oligomeric precursor in the presence of plasticizer to form a PEO derived pressure sensitive adhesive.

Non-limiting examples of methods of free radical polymerization include using free radicals generated from thermal, redox, or photochemical initiators as well as those due to exposure of the mixture to actinic radiation.

A feature of the present invention is the solventless preparation of a PEO derived network plasticized by essentially non-volatile polar plasticizer to form hydrophilic pressure sensitive adhesives.

Another feature of the present invention is the formation of hydrophilic pressure sensitive adhesives having electrolyte therein to render the adhesive ionically conductive.

An advantage of the present invention is the ease of solventless, in situ polymerization of a PEO pressure sensitive adhesive that is resistant to loss of plasticity due the presence of essentially non-volatile polar plasticizer.

Non-limiting embodiments of the invention follow a brief description of the drawing.

EMBODIMENTS OF THE INVENTION

Figure 1:
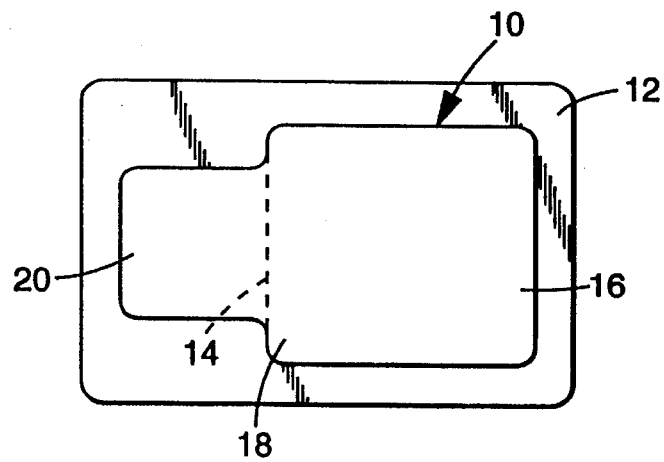
FIG. 1 is a top plan view of a biomedical electrode containing hydrophilic pressure sensitive adhesive of the present invention.

Hydrophilic PEO pressure sensitive adhesives of the present invention are prepared by exposing to a source of free radicals a difunctional oligomeric precursor containing a poly(ethylene glycol) moiety in the presence of essentially non-volatile, polar plasticizer compatible with this polymer in an amount to render the resulting PEO derived network a pressure sensitive adhesive.

In order for the resulting swollen PEO derived network to possess a degree of pressure sensitive tack, preferably the oligomeric precursor should be present in an amount ranging from about 4 to 60 weight percent of the final PEO pressure sensitive adhesive with the balance comprising essentially non-volatile polar plasticizer.

Insufficient precursor amounts can lead to difficulty during polymerization, yielding a polymer network having inadequate cohesive strength. Excessive precursor can lead to a resulting polymeric network having an excessive modulus, which diminishes adhesive properties.

Similarly, the molecular weight of the telechelic poly(ethylene glycol) in the oligomeric precursor can affect adhesive properties since that telechelic poly(ethylene glycol) moiety in the polymer determines the crosslink density of the resulting polymer network. Insufficient molecular weight results in a brittle, tack free elastomer. Excessive molecular weight results in diminished cohesive strength.

Preferably, molecular weights (number average) for the telechelic poly(ethylene glycol) range from about 2,000 to about 20,000 g/mole. Molecular weights in this region polymerize to yield a polymer having an appropriate balance of tack and cohesive strength necessary for providing a pressure sensitive adhesive after plasticization.

Most preferably, the optimum balance of adhesive properties is obtained when the weight percent of polymer network ranges from about 15 to about 25 weight percent and the molecular weight for the telechelic poly(ethylene glycol) ranges from about 6,000 to about 12,000 g/mole.

Poly(ethylene glycol) homopolymers terminated with either hydroxyl or primary amine functionality are commercially available within the preferred molecular weight range and serve as suitable moieties to the desired oligomeric precursors. Alternatively, lower molecular PEG diols or diamines can be condensed with coupling agents, for example, diisocyanates (to provide polyurethanes and polyureas) or diacids or esters (to provide polyesters and polyamides) to give moieties to the oligomeric precursors of appropriate molecular weight by proper choice of reactant ratios.

When such chain extension of low molecular weight PEG diols and diamines is used to increase molecular weight into the preferred region, the condensation of the coupling agents with the PEG hydroxyl or amine functionality leads to non-poly(ethylene glycol) radicals enchained in the PEG oligomeric precursor. These non-poly(ethylene glycol) radicals are represented by the organic divalent linking group R in Formula I above.

As one skilled in the art will recognize, when a molar excess of PEG diol or diamine is used relative to the coupling agent, a higher molecular weight PEG diol or diamine results. On the other hand, when the coupling agent is present in excess, the chain extended PEG is terminated with the functionality present in the coupling agent (e.g., isocyanate or carboxylic acid). Thus, any of these materials are useful in the preparation of the free-radically curable telechelic PEG oligomeric precursors.

In order for such chain extended precursors to maintain the desirable hydrophilicity and flexibility inherent in the PEG, it is important that the level of coupling agent be kept relatively low. Hence the molecular weight of the starting PEG should not be less than about 400 g/mole for these chain extended precursors.

The telechelic oligomeric precursors useful in the present invention can be prepared by reaction of the diol or diamine precursors described above with an electrophile having ethylenic unsaturation, (X in Formula I above), and such other functionality that, upon reaction with the PEG diol or diamine, not only an X group, but also an amide, substituted amide, amine, urea, urethane, carbonate, ester, or ether moiety is provided.

Nonlimiting examples of the types of functionality required in such electrophilic compounds include acid halide, acid anhydride, cyclic anhydride, and azlactones, each of which provides an amide moiety on reaction with the amine and an ester functionality on reaction with the alcohol; isocyanate, which provides a urea moiety on reaction with the amine and a urethane moiety on reaction with the alcohol; benzyl halide, which provides a substituted amine moiety on reaction with the amine and an ether moiety on reaction with the alcohol; and epoxy or acrylate, each of which provide a substituted amine moiety on reaction with the amine.

Nonlimiting examples of electrophiles suitable for reaction with the PEG diol or diamine precursors to produce the telechelic oligomeric precursors of the present invention include but are not limited to isocyanatoethyl methacrylate; alkenyl azlactones such as vinyl dimethyl azlactone and isopropenyl azlactone; m-isopropenyl-alpha, alpha-dimethyl benzyl isocyanate; glycidyl methacrylate; acryloyl ethyl carbonic anhydride; maleic anhydride; methacrylic anhydride,; and multifunctional acrylates such as hexanediol diacrylate and trimethylol propane triacrylate. The alcohol can also be derivatized through an esterification reaction with, for example, acrylic acid, or through a transesterification reaction with, for example, an alkyl acrylate. Alternatively, the diol or diamine can be reacted first with a compound containing two electrophilic groups, e.g. a diisocyanate, (or with a compound such as phosgene) and the resultant product reacted in a second step with a nucleophile, e.g., an amine or an alcohol, to provide the terminally difunctional oligomeric precursors. Nonlimiting examples of such nucleophiles include hydroxyethyl acrylate, hydroxyethyl methacrylate, and hydroxypropyl methacrylate. Such an approach is also useful when an excess of coupling agent is used to prepare the chain extended PEG as described above.

The resulting telechelic oligomeric precursor can be represented by Formula I identified above. Preferably, R is represented by Formula II below:

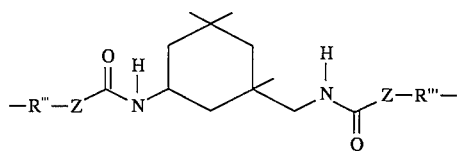

wherein Z is selected from the group consisting of —O— and —NH— and R''' is a divalent $C_1$ to $C_4$ alkyl radical.

Preferably, X comprises R'CH=C(R")—, wherein R' is selected from the group consisting of hydrogen and —COOH and R" is selected from the group consisting of hydrogen, methyl, and —CH$_2$COOH. Most preferably, R' comprises hydrogen and R" is selected from the group consisting of hydrogen and methyl.

The organic divalent linking group Y is generated upon reaction of the electrophile with the diamine or diol and is chosen so as to activate the ethylenically unsaturated monovalent X group towards free radical polymerization. The Y group accomplishes this by changing the electron density of X. Preferably, Y is selected from the group of structures containing aromatic moieties which, when bound to X, yield vinyl pyridinyl or styrenic-type functionalities; structures containing carboxyl moieties which when bound to X at the oxygen side yield vinyl ester or isopropenyl ester-type functionalities; structures containing carboxyl moieties which when bound to X at the carbonyl side yield acrylate, methacrylate, maleate, fumarate, and itaconate-type functionalities; structures containing carboxamide moieties which when bound to X at the nitrogen side yield N-vinyl amide and N-isopropenyl amide-type functionality; and structures containing carboxamide moieties which when bound to X at the carbonyl side yield acrylamide, methacrylamide, and maleimide-type functionalities.

The amount of oligomeric precursor of Formula I preferably ranges from about 4 to 60 weight percent (and most preferably about 15 to 25 weight percent) of the hydrophilic pressure sensitive adhesive.

The essentially, non-volatile, polar plasticizer is present in an amount preferably ranging from about 96 to 40 (and most preferably ranging from about 85 to 75) weight percent prior to in situ polymerization.

The plasticizer serves to minimize the crystallization of the PEG moiety of the polymeric network at ambient and mammalian body temperatures, increase the compliance of the polymeric network to give pressure sensitive adhesive properties and conformability to mammalian bodies and other curved surfaces, and modify the tack or thumb appeal of the pressure sensitive adhesive.

The plasticizer can also serve as a solvent to dissolve other additives including initiators, electrolytes, and pharmacologically active components.

The plasticizer is essentially non-volatile because using water alone as the plasticizer for the oligomeric precursor of Formula I above yields materials with poor to moderate tack which are prone to rapid loss of moisture and a concomitant change into a leathery material when exposed to ambient conditions. Hence, preferred essentially non-volatile, polar plasticizers are hydroxy-containing plasticizers miscible with both water and the precursor, including those selected from the group consisting of alcohols, mixtures of alcohols, and mixtures of water and alcohols such that the mixture of alcohol, water, and oligomeric precursor is liquid in the uncured state and displays pressure sensitive tack once polymerized in situ. Preferably, the alcohol should have low volatility to minimize dryout problems and should not greatly interfere with the subsequent polymerization of the oligomeric precursor.

Nonlimiting examples of suitable alcohols include glycerin, propylene glycol, dipropylene glycol, sorbitol, 1,3-butanediol, 1,4-butanediol, trimethylol propane, and ethylene glycol and derivatives given by Formula III:

$$MO(CH_2CH_2O)_mH \qquad \text{III}$$

wherein

M is selected from the group consisting of hydrogen and $C_1$ through $C_6$ alkyl, and m is an integer of about 1 to about 25.

Most preferably, the essentially non-volatile, polar plasticizer is a mixture of water and 300 or 400 molecular weight (weight average) polyethylene glycol. In Formula III, that molecular weight range is satisfied when m=7 or 9, respectively, and M=H. The selection of this plasticizer mixture has been found to provide the best balance of pressure sensitive adhesive properties.

In situ, solventless polymerization of the oligomeric precursor in the presence of the plasticizer is accomplished by exposing it to a source of free radicals. As one skilled in the art will recognize, free radicals may be generated by thermal, redox, or photochemical means or by exposure of the material to a source of actinic radiation.

Suitable thermal initiators include azo compounds, peroxides, and persulfates and when the latter two groups are used in combination with a reducing agent such ascorbic acid or a bisulfite compound and optionally, a catalytic amount of a transition metal salt such as iron or copper, redox generation of radicals may occur even at sub-ambient temperatures.

When visible or ultraviolet light is used for curing, a photoinitiator is included. Suitable photoinitiators include benzoin ethers, benzophenone and derivatives thereof, acyl phosphine oxides, acetophenone derivatives, camphorquinone, and the like. Suitable light sources to effect this cure include medium pressure mercury lamps and low intensity "black light" fluorescent bulbs. Initiator is generally used at a concentration of from about 0.05% to about 5%.

In the absence of initiator, exposure to actinic radiation such as electron beam irradiation or a cobalt 60 gamma source will also generate free radicals.

Additives can also be incorporated into the mixture for altering properties of the resulting hydrophilic pressure sensitive adhesive. Nonlimiting examples include low levels of copolymerizable vinyl monomers and non-functionalized compatible polymers.

Low levels of copolymerizable vinyl monomers, particularly those miscible in the oligomeric precursor/plasticizer mixture, can serve to accelerate the rate of polymerization, particularly when the functionalized PEG moiety in Formula I is capped with a relatively sluggish end-group such as the alpha-methyl styryl moiety obtained from m-isopropenyl-alpha, alpha-dimethyl benzyl isocyanate. Preferred copolymerizable monomers include acrylic acid and methacrylic acid and their ammonium and alkali metal salts, N-vinyl pyrrolidone, acrylamide, 2-acrylamido-2-methyl propane sulfonic acid and its ammonium and alkali metal salts, hydroxylethyl acrylate, hydroxyethyl methacrylate, 2-ethoxyethyl acrylate, 2-ethoxyethyl methacrylate, and 2-(2-ethoxyethoxy)ethyl acrylate.

When utilized, the amount of copolymerizable vinyl monomer preferably comprises from about 2 to about 15 weight percent of the total weight of resulting pressure sensitive adhesive.

Addition of non-functionalized compatible polymers can enhance the viscosity of the oligomeric precursor prior to polymerization to impart better coatability for, for example, pattern coating of the resulting hydrophilic pressure sensitive adhesive. Suitable polymers include those that are hydrophilic and compatible in the precursor/plasticizer mixture including moderate and high molecular weight poly(ethylene oxide), poly(acrylic acid), poly(N-vinyl pyrrolidone), poly(vinyl alcohol), and poly(acrylamide).

The precursor/plasticizer mixture can be coated via any of a variety of conventional coating methods, such as roll coating, knife coating, or curtain coating, or can be extruded. The low viscosity of the mixture allows for injection into cavities of, for example, a monitoring biomedical electrode for electrocardiography (ECG), or pattern coating of the adhesive precursor is possible, particularly with viscosity enhancement. The mixture can be coated directly on to the flexible substrate of choice prior to in situ polymerization, including metal foils and metallized polymeric films for conductive adhesives, or can be coated and cured on a release liner to yield a transfer adhesive. In this latter application, it is desirable to embed a tissue paper or non-woven fabric scrim in the precursor to allow for ease of handling.

Polymerizing is best accomplished with the exclusion of oxygen, either in an inert atmosphere such as nitrogen or argon, or by covering the precursor with a non-oxygen permeable film. When done photochemically, this film cover should be substantially transparent to the wavelengths of interest.

USEFULNESS OF THE INVENTION

The hydrophilic PEO pressure sensitive adhesives of the present invention are useful in a variety of applications including use as high moisture vapor transmissive wound or burn dressings, as adhesives used in transdermal drug delivery, as repulpable adhesives in, for example, splicing applications in the paper industry, and as conductive adhesives or gels in biomedical electrode applications. In this last application, a high degree of pressure sensitive adhesive tack may not be required when, for instance, a non-conductive, hypoallergenic pressure sensitive adhesive borders the conductive adhesive in the electrode construction.

The adhesives prepared according to the present invention possess sufficient cohesive strength to achieve generally more cohesion than adhesiveness in use allowing for clean removal from skin. However, such adhesives do not have internal integrity required for applications such as hydrophilic contact lenses or membranes which must withstand large pressure differentials. When used as adhesive sheets, it may be desirable to cure them with an embedded support to allow for ease in handling and dimensional stability.

BIOCOMPATIBLE AND/OR THERAPEUTIC AND/OR IONICALLY-CONDUCTIVE ADDITIVES

Depending upon the use of the hydrophilic, PEO pressure sensitive adhesive of the present invention, various biocompatible and/or therapeutic and/or ionically-conductive materials can be included in the adhesive.

For example, adhesives of the present invention can be used as conductive adhesive in a biomedical electrode with the addition of an ionically-conductive electrolyte to the adhesive. Nonlimiting examples of electrolyte include ionic salts dissolved in the adhesive to provide ionic conductivity and can include magnesium acetate, magnesium sulfate, sodium acetate, sodium chloride, lithium chloride, lithium perchlorate, sodium citrate, and preferably potassium chloride to enhance ionic conductivity of the hydrophilic pressure sensitive adhesive.

Alternatively, a redox couple such as a mixture of ferric and ferrous salts such as sulfates and gluconates can be added.

The amounts of these ionic salts present in adhesives of the present invention are relatively small, from about 0.5 to 7 percent by weight of the adhesive, and preferably about 2 to 5 weight percent. When a redox couple is used, the biomedical electrode can recover from an overload potential. U.S. Pat. No. 4,846,185 (Carim) discloses a redox couple totalling not more than about 20 percent by weight of the adhesive.

Hydrophilic, PEO pressure sensitive adhesives of the present invention can also be used in the delivery of pharmaceuticals to or through mammalian skin, such as topical or transdermal drug delivery systems. The pharmaceutical or other active ingredient can be compounded with the adhesive after polymerization, minimizing any possible deleterious interaction of the pharmaceutical or active ingredient with the polymerizing process.

A type of therapeutic procedure both involving application of electrical current to skin of a patient and a pharmaceutical is iontophoresis, which delivers an iontophoretically active pharmaceutical to or through mammalian skin with aid of an electrical current.

The hydrophilic, PEO pressure sensitive adhesive can also be used in therapeutic mammalian skin coverings, such as dressings, wound closure materials, tapes, and the like. Preferably, for mammalian skin covering uses, other biologically active materials can be added to the adhesive of the present invention after polymerization without deleteriously affecting the biologically active material. Nonlimiting examples of such other biologically active materials include broad spectrum antimicrobial agents where it is desired to reduce bacteria levels to minimize infection risk or treat the effects of infections at the skin or skin openings of a mammalian patient. Broad spectrum antimicrobial agents are disclosed in U.S. Pat. No. 4,310,509, which disclosure is incorporated by reference. Nonlimiting examples of other antimicrobial agents include parachlorometaxylenol; triclosan; chlorhexidine and its salts such as chlorhexidine acetate and chlorhexidine gluconate; iodine; iodophors; poly-N-vinyl pyrrolidone-iodophors; silver oxide, silver and its salts, antibiotics (e.g., neomycin, bacitracin, and polymyxin B). Antimicrobial agents can be included in the adhesive after polymerization in a weight from about 0.01 percent to about 10 percent by weight of the total adhesive.

Other biocompatible and/or therapeutic materials can be added to the adhesive such as compounds to buffer the pH of the adhesive to provide a non-irritating pH for use with sensitive mammalian skin tissue or to otherwise maximize antimicrobial activity. Also, penetration enhancing agents or excipients can be added to the adhesive when the pharmaceutical or other active agent for topical or transdermal delivery so requires.

BIOMEDICAL ELECTRODES

Biomedical electrodes employing hydrophilic, pressure sensitive adhesives of the present invention having electrolyte contained therein are useful for diagnostic and therapeutic purposes. In its most basic form, a biomedical electrode comprises a conductive medium contacting mammalian skin and a means for electrical communication interacting between the conductive medium and electrical diagnostic, therapeutic, or electrosurgical equipment.

Figure 2:
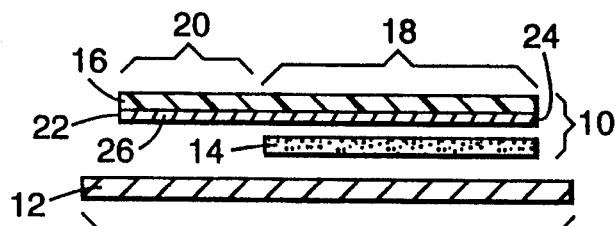
FIG. 2 is an exploded sectional view of the biomedical electrode of FIG. 1.

FIGS. 1 and 2 show either a disposable diagnostic electrocardiogram (ECG) or a transcutaneous electrical nerve stimulation (TENS) electrode 10 on a release liner 12. Electrode 10 includes a field 14 of a biocompatible and adhesive conductive medium for contacting mammalian skin of a patient upon removal of protective release liner 12. Electrode 10 includes means for electrical communication 16 comprising a conductor member having a conductive interface portion 18 contacting field 14 of conductive medium and a tab portion 20 extending beyond field 14 of conductive medium for mechanical and electrical contact with electrical instrumentation (not shown). Means 16 for electrical communication includes a conductive layer 26 coated on at least the side 22 contacting field 14 of conductive medium.

It is foreseen that a typical ECG conductor member 16 will comprise a strip of material having a thickness of about 0.05–0.2 millimeters, such as polyester film and have a coating 26 on side 22 of silver/silver chloride of about 2.5–12 micrometers, and preferably about 5 micrometers thick thereon. Presently preferred is a polyester film commercially available as "Mellinex" 505-300, 329, or 339 film from ICI Americas of Hopewell, Va. coated with a silver/silver chloride ink commercially available as "R-300" ink from Ercon, Inc. of Waltham, Mass. A TENS conductor member 16 can be made of a nonwoven web, such as a web of polyester/cellulose fibers commercially available as "Manniweb" web from Lydall, Inc. of Troy, N.Y. and have a carbon ink layer 26 commercially available as "SS24363" ink from Acheson Colloids Company of Port Huron, Mich. on side 22 thereof. To enhance mechanical contact between an electrode clip (not shown) and conductor member 16, an adhesively-backed polyethylene tape can be applied to tab portion 20 on side 24 opposite side 22 having the conductive coating 26. A surgical tape commercially available from 3M Company as "Blenderm" tape can be employed for this purpose.

Non-limiting examples of biomedical electrodes which can use hydrophilic, pressure sensitive adhesives of the present invention as conductive adhesive fields include electrodes disclosed in U.S. Pat. Nos. 4,527,087; 4,539,996; 4,554,924; 4,848,353 (all Engel); 4,846,185 (Carim); 4,771,713 (Roberts); 4,715,382 (Strand); 5,012,810 (Strand et al.); 5,133,356 (Bryan et al.) and copending and co-assigned U.S. patent application Ser. No. 07/686,049, the disclosures of which are incorporated by reference herein.

Because hydrophilic pressure sensitive adhesives of the present invention can also be characterized as gels having pressure sensitive adhesive properties, the adhesives can also be used as the gelled contact in a conventional gel electrolyte biomedical electrode having a snap-eyelet means of electrical communication. Further description of such biomedical electrodes are found in U.S. Pat. Nos. 3,805,769 (Sessions); 3,845,757 (Weyer); and 4,640,289 (Craighead), the disclosures of which are incorporated by reference.

Figure 5:
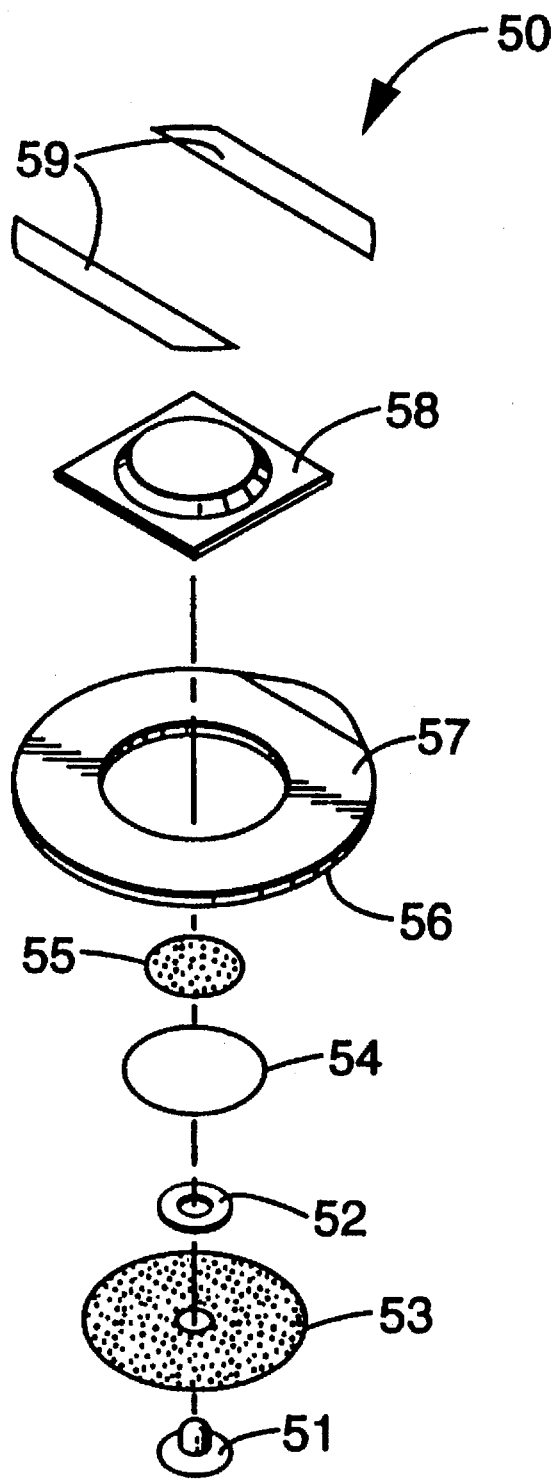
FIG. 5 is an exploded view of a biomedical electrode using the hydrophilic, pressure sensitive adhesive of the present invention and described in the Examples.

Nonlimiting examples of such biomedical electrodes are those marketed by a number of companies (including Minnesota Mining and Manufacturing Company which markets using the brand "Red Dot"), including those snap-type monitoring electrodes typified by the exploded view of an electrode 50 shown in FIG. 5.

A metallic stud 51, (such as stainless steel eyelet No. 304 commercially available from companies such as Eyelets for Industry of Thomaston, Conn.) joins a plastic, metallic plated eyelet 52 (such as an ABS plastic eyelet silver-plated and chlorided commercially available from Micron Products of Fitchburg, Mass.) through an aperture in a polymeric backing 53 (such as front label stock of printed white polyethylene commercially available from Prime Graphics of West Chicago, Ill.). The inner surface of the polymeric backing is coated with an adhesive (such as a phenolic-cured smoke crepe natural rubber based adhesive). Contacting the eyelet 52 at the plated surface is a wood pulp scrim 54 (such as an "Airtex 399" scrim commercially available from James River Corporation of Green Bay, Wis.), loaded with a quantity 55 of hydrophilic pressure sensitive adhesive of the present invention. Scrim 54 and adhesive 55 reside in a cavity of a 0.16 cm thick polyethylene foam 56 coated with either 12 grains of a 91:9 isooctyl acrylate:N-vinyl-2-pyrrolidone copolymer pressure sensitive adhesive or 18 grains of a 94:6 isooctyl acrylate:acrylic acid copolymer tackified with a "Foral" branded colophony acid rosin, such as "Foral AX" or "Foral 85" rosins commercially available from Hercules Corporation present in an amount of about 35–40 weight percent of the copolymer solids. The pressure sensitive adhesive is covered by a tabbed antifungal liner 57 (such as 83 pound bleached release paper under the brand "Polyslik S-8004" treated with "Calgon TK-100" brand fungicide, both liner and treatment commercially available from H.P. Smith Company of Chicago, Ill.). Scrim 54 and adhesive 55 are protected by a cap 58, (such as a 0.25 mm "PETG" polyester film commercially available from Weiss Company of Chicago, Ill.) secured in place by dual strips 59 of adhesive tape (such as "3M" brand "Type 2185" tape). Biomedical electrodes marketed by a number of companies, and the components used in such electrodes, provide combinations of alternative materials useful as snap-type monitoring biomedical electrodes to incorporate hydrophilic pressure sensitive adhesive of the present invention. The removal of conductive gel and its supporting structure from the center of a commercially available monitoring biomedical electrode and the replacement with hydrophilic pressure sensitive adhesive of the present invention can provide a superior biomedical electrode. Alternatively, such electrodes can be manufactured using equipment described in U.S. Pat. No. 4,640,289 (Craighead).

In some instances, the means for electrical communication can be an electrically conductive tab extending from the periphery of the biomedical electrodes such as that seen in U.S. Pat. No. 4,848,353 or can be a conductor member extending through a slit or seam in an insulating backing member, such as that seen in U.S. Pat. No. 5,012,810. Otherwise, the means for electrical communication can be an eyelet or other snap-type connector such as that disclosed in U.S. Pat. Nos. 4,640,289 and 4,846,185. Further, the means for electrical communication can be a lead wire such as that seen in U.S. Pat. No. 4,771,783. Regardless of the type of means for electrical communication employed, a hydrophilic, pressure sensitive adhesive of the present invention, containing an electrolyte, can reside as a field of conductive adhesive on a biomedical electrode for diagnostic, therapeutic, or electrosurgical purposes.

MEDICAL SKIN COVERINGS

Medical skin coverings employing hydrophilic, PEO pressure sensitive adhesives of the present invention, optionally having antimicrobial and other biologically active agents contained therein, are useful for treatment of mammalian skin or mammalian skin openings, preferably against the possibility of infection.

Figure 3:
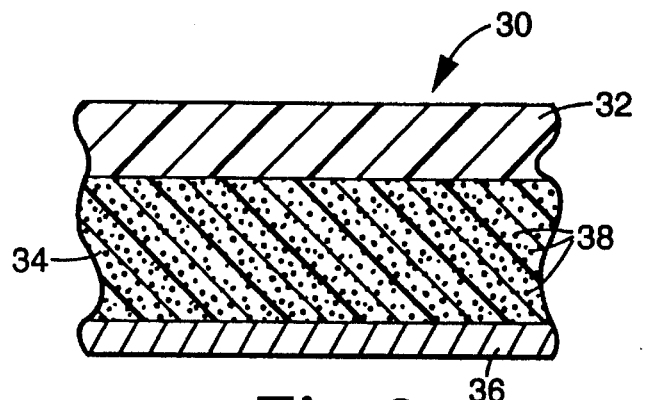
FIG. 3 is a sectional view of a medical mammalian skin covering containing hydrophilic, pressure sensitive adhesive of the present invention.

FIG. 3 shows a sectional view of a medical skin covering 30 having a backing material 32, a layer 34 of pressure sensitive adhesive of the present invention coated on backing material 32, and protected until use by a release liner 36. Preferably, antimicrobial 38 is contained in layer 34 by adding agent 38 to the adhesive prior to coating on backing material 32.

For use, the release liner 36 is removed and the layer 34 of pressure sensitive adhesive can be applied to the skin of the patient as a part of a medical tape, a wound dressing, a bandage of general medicinal utility, or other medical device having water moisture absorbing properties.

The adhesive layer 34 may be coated on a layer of backing material 32 selected from any of several backing materials having a high moisture vapor transmission rate for use as medical tapes, dressings, bandages, and the like. Suitable backing materials include those disclosed in U.S. Pat. Nos. 3,645,835 and 4,595,001, the disclosures of which are incorporated by reference. Other examples of a variety of films commercially available as extrudable polymers include "Hytrel$^R$ 4056" and "Hytrel$^R$ 3548" branded polyester elastomers available from E.I. DuPont de Nemours and Company of Wilmington, Del., "Estane" branded polyurethanes available from B.F. Goodrich of Cleveland, Ohio or "Q-thane" branded polyurethanes available from K.J. Quinn & Co. of Malden, Mass.

The layer 34 of adhesive combined with a layer 32 of suitable backing material can be used as a dressing.

Hydrophilic, PEO pressure sensitive adhesives of the present invention can be used as discrete gel particles dispersed in a continuous pressure sensitive adhesive matrix to form a two phase composite useful in medical applications, as described in co-pending, co-assigned U.S. patent application Ser. No. 07/905,490, the disclosure of which is incorporated by reference herein.

The adhesive layer 34 can be coated on the backing layer 32 by a variety of processes, including, direct coating, lamination, and hot lamination. The release liner 36 can thereafter be applied using direct coating, lamination, and hot lamination.

The methods of lamination and hot lamination involve the application of pressure, or heat and pressure, respectively, on the layer of adhesive layer 34 to the backing material layer 32. The temperature for hot lamination ranges from about 50° C. to about 250° C., and the pressures applied to both lamination and hot lamination range from 0.1 Kg/cm$^2$ to about 50 Kg/cm$^2$.

PHARMACEUTICAL DELIVERY DEVICES

Pharmaceutical delivery devices employing hydrophilic, pressure sensitive adhesives of the present invention, optionally having a topical, transdermal, or iontophoretic therapeutic agent and excipients, solvents, or penetration enhancing agents contained therein, are useful for delivery of pharmaceuticals or other active agents to or through mammalian skin.

Figure 4:
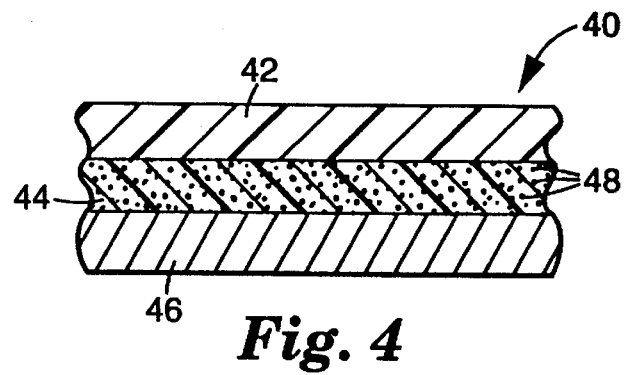
FIG. 4 is a sectional view of a pharmaceutical delivery device containing hydrophilic, pressure sensitive adhesive of the present invention.

FIG. 4 shows a sectional view of a transdermal or topical drug delivery device 40 having a backing layer 42, a layer 44 containing hydrophilic, PEO pressure sensitive adhesive of the present invention coated thereon and protected by a release liner 46. Other layers can be present between layer 42 and layer 44 to house pharmaceuticals or other therapeutic agents. Otherwise, as shown in FIG. 4, pharmaceutical and other agents 48 are dispersed in adhesive layer 44.

The backing layer 42 can be any backing material known to those skilled in the art and useful for drug delivery devices. Non-limiting examples of such backing materials are polyethylene, ethylene-vinyl acetate copolymer, polyethylene-aluminum-polyethylene composites, and "ScotchPak™" brand backings commercially available from Minnesota Mining and Manufacturing Company of St. Paul, Minn. (3M).

The release liner 46 can be any release liner material known to those skilled in the art. Non-limiting examples of such release liners commercially available include siliconized polyethylene terephthalate films commercially available from H.P. Smith Co. and fluoropolymer coated polyester films commercially available from 3M under the brand "ScotchPak™" release liners.

The therapeutic agent 48 can be any therapeutically active material known to those skilled in the art and approved for delivery topically to or transdermally or iontophoretically through the skin of a patient. Non-limiting examples of therapeutic agents useful in transdermal delivery devices are any active drug or salts of those drugs, used in topical or transdermal applications, or growth factors for use in enhancing wound healing. Other therapeutic agents identified as drugs or pharmacologically active agents are disclosed in U.S. Pat. Nos. 4,849,224 and 4,855,294, and PCT Patent Publication WO 89/07951.

Excipients or penetration enhancing agents are also known to those skilled in the art. Non-limiting examples of penetration enhancing agents include ethanol, methyl laurate, oleic acid, isopropyl myristate, and glycerol monolaurate. Other penetration enhancing agents known to those skilled in the art are disclosed in U.S. Pat. Nos. 4,849,224; and 4,855,294 and PCT Patent Publication WO 89/07951.

The method of manufacturing a transdermal delivery device depends on its construction.

The drug delivery device 40 shown in FIG. 4 can be prepared using the following general method. A solution is prepared by dissolving the therapeutic agent 48 and such optional excipients as are desired in a suitable solvent and mixed into either plasticizer prior to forming the adhesive, during the formation of the adhesive, or directly into the already formed adhesive. The resulting loaded adhesive is coated on the backing layer 42. A release liner 46 is applied to cover loaded adhesive layer 44.

EXAMPLES

The invention is further illustrated by the following examples, in which all parts are by weight unless otherwise stated.

Initial Tack

The adhesive composition was evaluated for initial tack immediately following curing. In this test, firm pressure was applied to the sample with a thumb and the thumb removed. Tack was qualitatively assessed and assigned a value of 1 through 5 where 1=very firm, tack free; 2=moderately firm, acceptable tack; 3=moderately soft, good tack, no residue; 4=moderately soft, acceptable tack, no residue; 5=very soft, residue transferred to thumb on removal. On this scale values of 2, 3, and 4 represented adhesives with a desirable balance of sufficient compliance to possess tack and sufficient integrity to possess cohesive strength.

EXAMPLES 1–5 AND COMPARATIVE EXAMPLES A AND B 2,000 mw poly(ethylene oxide) diamine (available from Texaco Chemical Company, Houston, Tex. under the brand "Jeffamine ED-2001") was melted by holding in a 55° C. oven for 4 hours. 350 grams was dissolved in a mixture of 130.2 g deionized water and 130.2 g 300 mw polyethylene glycol, PEG 300, (available from BASF Corporation, Parsippany, N.J. under the brand "Pluracol E300") and allowed to cool to room temperature. 87.2 gram aliquots (containing 50 g or 50 milliequivalents of the poly(ethylene oxide) diamine "Jeffamine ED-2001") of the resulting solution were charged into each of six 200 milliliter glass jars. These were placed in a water bath at room temperature and an overhead mechanical stirring paddle immersed in the solution. Isophorone diisocyanate, IPDI, (available from Aldrich Chemical Company, Milwaukee, Wis.) in the amounts shown in Table I was added portionwise over the course of several minutes, so as to maintain a temperature below 45° C. Stirring was continued until either 10 minutes had elapsed, or the solution became too viscous to satisfactorily stir. The mixing paddle was withdrawn, 2-vinyl-4,4-dimethyl-2-oxazolin-5-one, VDM, (available from S.N.P.E., Princeton, N.J.) in the amounts shown in Table I was charged in one portion, the mixture shaken or hand stirred as appropriate to obtain a homogeneous mixture, capped, and left in the dark overnight at room temperature. The approximate molecular weight of the resulting chain extended, functionalized, poly(ethylene glycol) oligomeric precursor is shown in Table I and was calculated based on first principles with the assumption that the diamine and diisocyanate are of high purity and that the reactions go to completion with no side reactions. The percent solids of the 2,000 and 4,000 mw oligomeric precursors were adjusted slightly by addition of 0.8 g and 0.4 g, respectively, of a 1/1 mix of PEG 300 and water so that all of these materials were at 60% solids in a 1/1 PEG 300/water mixture. Portions of each were diluted to 30% solids (5 g of 60% plus 5 g of 1/1 PEG 300/water) and 10% solids (4 g of 60% and 20 g of 1/1 PEG 300/water) and 0.5% 2-hydroxy-2-methyl-1-phenyl-propan-1-one photoinitiator (available from Ciba-Geigy Corporation, Hawthorne, N.Y. under the brand "Darocur 1173") was charged to each. After mixing well, a portion of each was distributed between 1.5 mil (0.038 mm) 164Z siliconized polyester liners available from the HP Smith Division of James River Corporation to a thickness of 25 mil (0.63 mm). The resulting laminate was exposed to a bank of six Sylvania 15 watt F15T8 350 black light bulbs at a distance of 15 cm for 10 minutes giving a total dose of 585 mJ/sq. cm. as measured by a Model UR365CH3 UV Integrating Radiometer available from Electronic Instrumentation & Technology, Incorporated, Sterling, Va. The top liner was removed from the cured material and the tack assessed as detailed above. Results are presented in Table I.

TABLE I

| Ex. | ED-2001 g | m equiv | IPDI g | m equiv | VDM g | m mole | Theoretical MW | Tack on Cure 10% Solids | 30% Solids | 60% Solids |
|---|---|---|---|---|---|---|---|---|---|---|
| Comp A | 50 | 50 | 0 | 0 | 6.96 | 50 | 2,000 | 1 | 1 | 1 |
| 1 | 50 | 50 | 2.78 | 25 | 3.48 | 25 | 4,000 | 2 | 1 | 1 |
| 2 | 50 | 50 | 4.17 | 37.5 | 1.74 | 12.4 | 8,000 | 5 | 3 | 2 |
| 3 | 50 | 50 | 4.63 | 41.6 | 1.16 | 8.3 | 12,000 | 5 | 5 | 3 |
| 4 | 50 | 50 | 4.86 | 43.7 | 0.87 | 6.3 | 16,000 | 5 | 5 | 3 |
| Comp. B | 50 | 50 | 5.00 | 45.0 | 0.70 | 5.0 | 20,000 | 5 | 5 | 5 |
| 5 | 1/1 Mix of 2K & 20K | | | | | | | 4 | | |

The results in Table I show that in order to achieve a balance of cohesion and tack, both oligomer molecular weight and percent solids are important and that molecular weights above about 2,000 and below about 20,000 are useful as are percent solids in the 10 to 60% region. Although neither the 2,000 (comparative example A) or 20,000 (comparative example B) molecular weight materials cure to give useful adhesives in this percent solids region, a 1/1 blend of them does give a useful adhesive (example 5).

EXAMPLES 6–10

6,000 molecular weight poly(ethylene oxide) diamine (available from Texaco Chemical Company, Houston, Tex. under the brand "Jeffamine ED-6000") was melted by holding in a 55° C. oven for 4 hours. 15 grams (5 milliequivalents) was charged to 100 milliliter jars containing 35 grams of the plasticizers listed in Table II, mixed, and allowed to cool to room temperature. 0.70 g (5 mmole) VDM was charged to each, the jar capped, the mixture shaken to obtain a homogeneous mixture, and left in the dark overnight. To 6 g of Example 6 (30% solids VDM capped "Jeffamine ED-6000" poly(ethylene oxide) in PEG 200) was charged 0.03 g 2-hydroxy-2-methyl-1-phenyl-propan-1-one photoinitiator ("Darocur 1173") and the resulting solution cured and evaluated as described above and given a tack value of 3. A 4 g portion of the 30% solids solutions of Examples 7 through 10 were diluted further to 20% solids with 2 g of the respective plasticizers, 0.03 g of photoinitiator ("Darocur 1173") charged, and cured and evaluated as described above, also all giving tack values of 3. These examples thus illustrate that a variety of plasticizers are useful for preparation of the adhesives described in the present disclosure.

TABLE II

| Example | Plasticizer | Solids | Tack Value |
|---|---|---|---|
| 6 | 200 mw Poly(ethylene glycol)[a] | 30% | 3 |
| 7 | Dipropylene glycol[b] | 20% | 3 |
| 8 | "Polyglycol P425"[c] | 20% | 3 |
| 9 | "Polyglycol 15-200"[d] | 20% | 3 |
| 10 | 350 mw poly(ethylene glycol) monomethyl ether[e] | 20% | 3 |

[a]Available from Sigma Chemical Company, St. Louis, MO
[b]Available from Aldrich Chemical Company, Milwaukee, WI
[c]Brand of 425 mw poly(propylene glycol) from Dow Chemical, Midland, MI
[d]Brand of 2600 mw copolymer of EO and PO from Dow Chemical, Midland, MI
[e]Available from Union Carbide, Danbury, CT under the "Carbowax" brand

EXAMPLES 11 THROUGH 16

A 6,000 molecular weight difunctional acrylate terminated poly(ethylene glycol) oligomer was prepared by dissolving 20 g (6.66 milliequivalents) 6,000 mw PEG (available from Fluka Chemical Corporation, Ronkonkoma, N.Y.) in 20 g methylene chloride in a 100 milliliter round bottom flask equipped with magnetic stirring bar, charging 1.01 g (10 millimoles) triethylamine (available from Aldrich Chemical Company, Milwaukee, Wis.), and with magnetic stirring while cooling in an ice water bath charging 0.66 g (7.3 millimoles—10% excess) acryloyl chloride dropwise. After stirring for 30 minutes, the precipitated triethylamine hydrochloride salt was filtered off, the solution concentrated somewhat on a rotary evaporator, the solution refiltered and diluted with 20 g deionized water. The resulting cloudy/inhomogeneous solution was concentrated further on the rotary evaporator, this time with mild heating until all methylene chloride was removed as indicated by the solution becoming clear. Solids on this aqeuous solution were analyzed, finding 48%. 2 g aliquots (containing 1.0 g 6,000 mw diacrylated PEG) were diluted with 2 g of the plasticizers listed in Table III, 0.02 g of photoinitiator ("Darocur 1173") added, and the 25% solids homogeneous solutions which resulted on mixing cured and evaluated for tack as detailed above. Results are presented in Table III and demonstrate that difunctional PEG oligomers obtained from PEG diols are useful in the practice of the present invention as are mixtures of a variety of plasticizers and water.

TABLE III

| Example | Plasticizer | Tack Value |
|---|---|---|
| 11 | Glycerine[e] | 3 |
| 12 | Propylene glycol[f] | 4 |
| 13 | 1,4-butanediol[g] | 4 |
| 14 | 350 mw poly(ethylene glycol) monomethylether[h] | 3 |
| 15 | 1450 mw poly(ethylene glycol)[h] | 3 |

TABLE III-continued

| Example | Plasticizer | Tack Value |
| --- | --- | --- |
| 16 | "Butyl carbitol"[i] | 4 |

[c]Available from Mallinkrodt, Inc. Paris, KY
[f]Available from EM Industries, Gibbstown, NJ
[g]Available from Aldrich Chemical Company, Milwaukee, WI
[h]Available under the "Carbowax" brand from Union Carbide, Danbury, CT
[i]Brand of the diethyleneglycol monobutylether available from Union Carbide, Danbury, CT

EXAMPLES 17 THROUGH 20

90 g of diamine ("Jeffamine ED-6000") was dissolved in 210 g of "Carbowax" PEG 350 monomethyl ether. To 50 g aliquots of the resulting solution (containing 15 g diamine ("ED-6000") or 5 milliequivalents) was charged 5 millimoles of the capping agents detailed below. After mixing to homogeneity, 2the resulting solutions were left in the dark at room temperature overnight.

Example 17: 0.70 g 2-vinyl-4,4-dimethyl-2-oxazolin-5-one, VDM, charged. 2 g of the resulting 30% solids solution was diluted with 4 g "Carbowax" PEG 350 monomethyl ether and 0.03 g "Darocur 1173" charged. Curing and tack evaluation on this 10% solids solution gave a tack value of 4.

Example 18: 0.78 g isocyanatoethyl methacrylate, (available from Showa Rhodia Chemicals K.K., Tokyo, Japan) charged. 2 g of the resulting 30% solids solution was diluted with 2 g "Carbowax" PEG 350 monomethyl ether and 0.02 g "Darocur 1173" added. Curing and tack evaluation on this 15% solids solution gave a tack value of 2.

Example 19: 1.01 g m-isopropenyl-alpha,alpha-dimethyl benzyl isocyanate (available from American Cyanamide, Wayne, N.J. under the brand "m-TMI") charged. 6 g of the resulting 30% solids solution was diluted with 2.55 g "Carbowax" PEG 350 monomethyl ether and 0.45 g acrylic acid (available from BASF Corporation, Parsippany, N.J.) and 0.03 g "Darocur 1173" added. Curing and tack evaluation on this 20% solids solution also containing 5% acrylic acid gave a tack value of 2.

Example 20: 0.77 g methacrylic anhydride (available from Aldrich Chemical Company, Milwaukee, Wis.) charged. 6 g of the resulting 30% solids solution was diluted with 2.82 g "Carbowax" PEG 350 monomethyl ether and 0.18 g acrylic acid and 0.03 g "Darocur 1173" added. Curing and tack evaluation on this 20% solids solution also containing 2% acrylic acid gave a tack value of 2.

EXAMPLE 21

Into a 250 milliliter round bottomed 3-necked flask equipped with mechanical overhead stirrer and distillation head was charged 22.5 g 10,000 mw poly(ethylene glycol), PEG 10K, (available from Hoechst Aktiengesellschaft, Frankfurt, Germany) and 22.5 g 8,000 mw poly(ethylene glycol), PEG 8K, (available from Dow Chemical Company, Midland, Mich.). The flask was immersed in an oil bath at 85° C. and the PEG mixture melted. With stirring 180 milligrams of "Isonox 129" brand antioxidant (available from Schenectady Chemicals, Freeport, Tex.), 20 g methyl acrylate (available from Hoechst Celanese Corporation, Dallas, Tex.), and 2.2 g p-toluene sulfonic acid monohydrate (available from Aldrich Chemical Company, Milwaukee, Wis.) was charged in that order. The reaction was continued for 4 hours in the 85° C. oil bath while slowly bubbling dry air through the reaction mixture. A moderate vacuum (water aspirator, 20 torr) was then pulled on the flask for 30 minutes to remove excess methyl acrylate, then a high vacuum (vacuum pump, <1 torr) pulled to remove the last traces. 45 milliliters of deionized water was charged to the warm fluid and the resulting solution cooled to room temperature and transferred to a storage jar. Aqueous potassium hydroxide was added to bring the pH to 7. Solids on this aqueous solution were analyzed, finding 48%. 43.75 g of this (containing 21 g of a 1/1 mix of acrylate functional PEG 8K and PEG 10K) was mixed with 0.25 g deionized water, 16 g of a 25% aqueous solution of potassium chloride (available from Fisher Scientific, Fair Lawn, N.J.), and 30 g of 300 mw poly(ethylene glycol) (available from BASF Corporation, Parsippany, N.J. under the brand "Pluracol E300"). To one 36 g portion of the resulting solution was charged 4 g of a solution of 1.13 g 30% aqueous hydrogen peroxide (available from Aldrich Chemical Company, Milwaukee, Wis.) in 48.9 g deionized water. To another 36 g portion of the resulting solution was charged 4 g of a solution of 1.76 g ascorbic acid and 39 milligrams ammonium iron (II) sulfate hexahydrate (both available from Aldrich) in 48.2 g deionized water. The two solutions were combined, mixed well, and poured between 1.5 mil (0.038 mm) 164Z siliconized polyester liners available from the HP Smith Division of James River Corporation to a thickness of 25 mil (0.63 mm). The resulting laminate cured on standing at room temperature within 30 minutes. The top liner was removed from the cured material and the tack assessed as detailed above, finding a value of 3. This example demonstrates the use of redox chemistry to cure a mixture of acrylated PEG diols (21%) in a 45/30 mixture of water and PEG 300 also containing 4% KCl.

EXAMPLE 22

Into a 500 milliliter 3-neck round bottomed flask equipped with nitrogen inlet and overhead mechanical stirrer was charged 60 g 8,000 mw poly(ethylene glycol) (available from Dow Chemical, Midland, Mich.), 50 g 12,000 mw poly(ethylene glycol) (available from Hoechst Aktiengesellschaft, Frankfurt, Germany), and 100 g chloroform. After stirring under nitrogen to dissolve the PEG mixture, 0.5 milliliters of a 0.33M stannous octoate (available from ICN Pharmaceuticals, Cosa Mesta, Calif.) in toluene and 0.2 milliliters triethyl amine was added. 5.6 g isophorone diisocyanate in 20 g chloroform was added in one portion and stirring continued for 1 hour at room temperature. 3.3 g of 2-hydroxyethyl methacrylate (available from Aldrich Chemical Company, Milwaukee, Wis.) was charged, rinsing in with 20 milliliters additional chloroform. After stirring at room temperature for 18 hours, the chloroform was removed with a rotary evaporator at high vacuum and 75° C. The resulting oligomeric precursor was formulated into a hydrophilic pressure sensitive adhesive by mixing 4 parts with 50 parts deionized water, 4 parts potassium chloride, and 42 parts PEG 300. Portions were cured photochemically and assessed using the procedure described above after charging 0.05% "Darocur 1173" photoinitiator. Thermal polymerization was also conducted by adding to a portion 0.1% azo-bis(isobutyronitrile) (available from E.I. Dupont, Wilmington, Del. under the brand "Vazo 64"), sealing in a polyethylene bag, and submersing in a 80° C. water bath for 30 minutes. In each case the resulting adhesive had a tack value of 4.

EXAMPLES 23 AND 24

1440 g of oven-melted "Jeffamine ED-2001" was charged into a 4 liter glass jar containing 536.7 g deionized water and 960 g of 400 mw poly(ethylene glycol), PEG 400, (available from BASF Corporation, Parsippany, N.J. under the brand "Pluracol E400"). The mixture was stirred with an overhead mechanical stirrer and cooled in a water bath while 120 g of isophorone diisocyanate was charged portionwise to maintain the reaction temperature below 45° C. Residual IPDI was rinsed with 80 g PEG 400 and stirring was continued for 2 hours. 50.1 g 2-vinyl-4,4-dimethyl-2-oxazolin-5-one was charged in one portion, rinsing in with 33.4 g PEG 400. The mixture was stirred to homogeneity, capped and left in the dark for three days. 1600 g of this solution was transferred to a second 4-liter jar and diluted with 419 g deionized water, 609.5 g PEG 400, and 609.5 g of a 25% aqueous solution of potassium chloride. A Brookfield viscosity on the resulting 21/4/30/30 oligomer/KCl/PEG 400/water solution was taken, showing 265 centipoise. A second 1600 g portion of the capped oligomer solution was diluted in similar fashion but further had 76.2 g of a 300,000 molecular weight poly(ethylene oxide) (available from Union Carbide, Danbury, Conn. under the brand "Polyox N-750") dissolved in it. This 21/4/30/30/2 oligomer/KCl/PEG 400/water/PEO 300K solution had a Brookfield viscosity of 1300 centipoise. To 170 g of the low viscosity material or 174 g of the moderate viscosity material charged 10 g of 0.2M aqueous ascorbic acid, 10 g of 0.00067M ammonium iron (II) sulfate hexahydrate, and, after mixing well, 10 g of 0.2M hydrogen peroxide. The resulting solutions were mixed well, cured between siliconized polyester liners, and evaluated as described in Example 21 above. Both adhesives had a tack value of 3. These examples show that moderate levels of high molecular weight polymer can be added to enhance viscosity without greatly influencing cure or adhesive properties.

EXAMPLE 25

Into a 190 liter stainless steel reactor was vacuumed 6.1 kg deionized water, 12.2 kg PEG 300, and 18.2 kg "Jeffamine ED-2001" which had been melted by holding in an oven at 65° C. for 8 hours. Medium agitation was started and the batch temperature was adjusted to 22° C. 1511 g of IPDI was added incrementally so that the batch temperature did not exceed 32° C. The container which held the IPDI was then rinsed with 8.4 kg PEG 300, flushing the lines into the kettle as well. The mixture was stirred for 1 hour at 22° C., then 630 g 2-vinyl-4,4-dimethyl-2-oxazolin-5-one, VDM, was charged in one portion, rinsing with 8.4 kg additional PEG 300. After stirring for 2 hours at 22° C., a solution of 3.9 kg potassium chloride in 22.9 kg deionized water was charged and mixing continued for 30 minutes. The resulting oligomeric precursor was drained through a 25-micrometer filter. To a 425 g portion of this precursor was added 25 g deionized water and 50 g of a solution of 3.52 g ascorbic acid and 78.4 milligrams ammonium iron (II) sulfate hexahydrate in 96.4 g deionized water. To a second 425 g portion of the precursor was charged 25 g deionized water and 50 g of a solution of 2.27 g 30% aqueous hydrogen peroxide in 97.7 g deionized water. These two solutions were used to fill the adjacent chambers of an "Express" brand two part delivery system (available from 3M Dental Products Division, St. Paul, Minn.) which had been modified to enable delivery through an 18 gauge syringe needle. This modification was accomplished by removing the mixing element from the static mixer and placing the cut-off end of a disposable syringe at the end of the static mixer, then replacing the mixing element. In this fashion the syringe needle could by joined to the static mixer. The two components were delivered through the static mixer into the gel chamber of the electrode blanks shown in FIG. 5 and prepared using equipment such as that described in U.S. Pat. No. 4,640,289 (in this case assembled with prechlorided silver/silver chloride eyelets 52) by inserting the needle through the front label 53 of the blank diametrically opposite to a vent hole which had been punched in the cap 58 with a 26 gauge needle. In this way it was possible to completely fill the cap. The resulting adhesive polymerized in situ within 30 minutes giving a material with a tack value of 3. After conditioning these electrodes for 3 days at 50° C. electrical testing was conducted as described below with results presented in Table IV.

EXAMPLE 26

Using the same procedure and scale described for Example 25, a second batch of precursor was prepared. The only difference was that the IPDI and VDM charges were changed slightly, using 1594 g IPDI and 530 g VDM resulting in a somewhat softer, more chain extended precursor. 2914 g of this precursor was diluted with 211.5 g PEG 300 and 831.5 g deionized water into which 22.9 g potassium chloride and 0.48 g sodium chlorite (available from Aldrich Chemical Company, Milwaukee, Wis.) had been dissolved. To this precursor was charged 20 g "Darocur 1173" photoinitiator. A 20 milliliter syringe was filled with this and an 18 gauge needle attached. Injection was done into the electrode blanks shown in FIG. 5 and prepared using equipment such as that described in U.S. Pat. No. 4,640,289 (this time assembled with a silver plated eyelet 52) on the cap 58 side that diametrically opposed the vent hole (punched with a 26 gauge needle). The resulting filled electrode was clamped to a board and passed through a PPG Industries UV Processor two times at 10 meters per minute with two medium pressure mercury lights on at a 80 watts/cm (200 watts/inch) power setting. At this speed and power setting each pass gave a dose of 61 mJ/sq. cm. as measured by the EIT UV Integrating Radiometer described above. The resulting adhesive cured immediately giving a material with a tack value of 3. After conditioning these electrodes for 3 days at 50° C., electrical testing was conducted as described above with results presented in Table IV.

ELECTRICAL TESTING OF EXAMPLES 25 AND 26

The gel-filled blank electrode 50 depicted in FIG. 5 formed a test electrode unit. Two electrode units, joined together adhesive surface to adhesive surface to form an electrode pair. This electrode pair was then tested in order to characterize its electrical response in comparison to the American National Standard developed by the Association for the Advancement of Medical Instrumentation for disposable ECG electrodes (approved 17 Dec. 1991 by the American National Standards Institute). The guideline values specified by this standard for such electrode pairs are:

a) DC offset voltage <100 mV b) AC impedance at 10 Hz <3000 ohms c) Defibrillation recovery—rate of change of residual polarization potential <+/− 1 mV/second and 10 Hz impedance <3000 ohms at the end of four test discharges d) Internal noise <150 mV e) Bias current tolerance <100 mV over a period of at least eight hours An Xtratek Electrode Tester (available from Xtratek, Lenexa, Kans.) was used to conduct these characterizations. Values obtained for an average of 16 pairs of electrodes of Examples 25 and 26 are shown in Table IV, except for noise and bias where values are only from a single pair of electrodes of Examples 25 and 26.

TABLE IV

| Example | DC Offset (mV) | AC Impedance at 10 Hz (ohms) | Defibrillation Recovery change mv/sec | Defibrillation Recovery ohms impedance at 10 Hz | Noise (mV) | Bias (mV) |
| --- | --- | --- | --- | --- | --- | --- |
| 25 | 1.76 | 154.0 | <±1 | 11.2 | 0.0 | 5.3 |
| 26 | 0.19 | 176.4 | <±1 | 9.4 | 0.0 | 3.3 |

Without being limited to the foregoing, the invention is hereby claimed.

What is claimed is:

1. A method of preparing a hydrophilic, pressure sensitive adhesive comprising subjecting a mixture of a difunctional poly(ethylene glycol) oligomeric precursor and an essentially non-volatile polar plasticizer to a source of free radicals to induce free radical polymerization of the oligomeric precursor in the presence of plasticizer to form a hydrophilic poly(ethylene oxide) pressure sensitive adhesive.

2. The method according to claim 1, wherein the subjecting step comprises:
   (a) mixing the oligomeric precursor and the plasticizer and a free radical initiator into a mixture;
   (b) coating the mixture on a substrate; and
   (c) free radically polymerizing the oligomeric precursor in the presence of the plasticizer in situ on the substrate.

3. The method according to claim 2, further comprising optionally mixing an electrolyte, an antimicrobial agent, or a pharmaceutical into the adhesive.

* * * * *